Sept. 3, 1946.                    D. J. ORR                    2,406,964
                    VARIABLE DELIVERY AND REVERSING PUMP
                           Filed Feb. 19, 1943
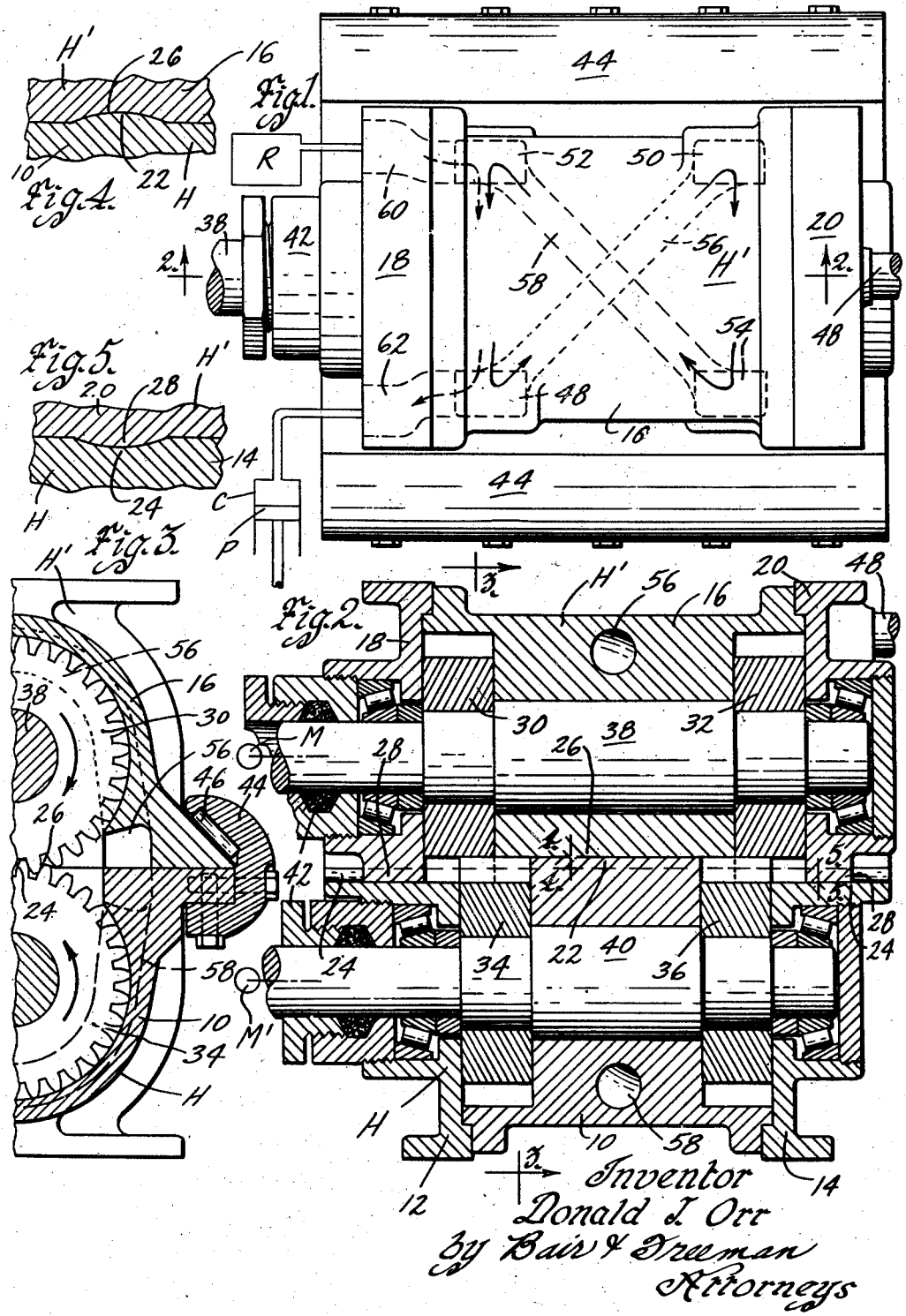

Patented Sept. 3, 1946

2,406,964

UNITED STATES PATENT OFFICE 2,406,964

VARIABLE DELIVERY AND REVERSING PUMP

Donald J. Orr, Arnolds Park, Iowa

Application February 19, 1943, Serial No. 476,376

2 Claims. (Cl. 103—120)

My present invention relates to a pump which has a variable delivery of oil or the like, and wherein the delivery may be reversed as desired.

One object of the invention is to provide a pump of this general character which is simple and inexpensive to manufacture.

A further object is to provide a pump structure having two pairs of rotors or gears meshing with each other and so arranged that one set can be unmeshed as the other is meshed for reversing flow of oil and varying it as desired.

Another object is to provide a two-section housing wherein the parts are relatively movable to effect the reversing and variable delivery operation of the pump structure.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a plan view of my pump structure showing diagrammatically how it may be connected to an oil reservoir and a power means such as a cylinder and piston;

Figure 2 is a vertical sectional view on the line 2—2 of Figure 1;

Figure 3 is a vertical sectional view on the line 3—3 of Figure 2, the pump rotors or gears being shown in end elevation in this figure; and Figures 4 and 5 are sectional views on the lines 4—4 and 5—5, respectively, of Figure 2 showing how certain portions of the two gear housings interfit with each other adjacent the gear teeth.

On the accompanying drawing I have used the reference character H to indicate generally a lower housing, and H' an upper housing. The housing H has a center section 10 and a pair of end plates 12 and 14. The upper housing H' has a center section 16 and a pair of end plates 18 and 20. These may be suitably bolted together to form a complete housing, with the necessary gaskets interposed between them to prevent leakage, in a well-known manner.

The housing H' is slidable axially relative to the housing H. They have interfitting surfaces, shown in Figures 4 and 5, the housing H having a convex center portion 22 and concave end portions 24. The upper housing H' has a complementary concave center portion 26 and convex end portions 28. The curvature of these portions is the same as the periphery of the pump rotors or gears shown at 30, 32, 34 and 36, the center sections 10 and 16 having suitable cavities to snugly receive the rotors.

The rotors 30 and 32 are secured to a shaft 38, and the rotors 34 and 36 are secured to a shaft 40 as by keys or the like (not shown). The shafts 38 and 40 are suitably journaled in bearings and pass through packing glands 42 to effect a seal. Each of the shafts 38 and 40 are connected to a source of power, such as electric motors M and M', respectively, shown diagrammatically in Figure 2. These motors will be matched so that each will deliver the same amount of power at all times. It would be difficult, if not impossible, to shift the gears to different positions if only one shaft were driven and were the sole driving means for the other through the gear teeth. Also, the pump is capable of much higher pressures when driven by two motors in this manner. It is not then limited by the capacity of the gears to transmit the power from one to the other. The double drive also eliminates uneven wear between the gears, due to uneven amounts of mesh. Obviously, internal combustion engines or other driving means can be provided for the shafts 38 and 40, or one driving means could be provided for one of the shafts with an external gear drive for the other.

The housings H and H' are provided with suitable slideways and retainer strips, such as shown illustratively at 44 in Figure 3. These may have rollers 46 to reduce friction when the housings are relatively adjusted.

For adjusting the housing H' relative to the housing H, a control rod 48 may be provided which, in its present position, shown in Figure 2, may be termed as neutral, because the gears 30 and 34 are meshing equally with respect to the gears 32 and 36.

The gears rotate in the direction of the arrows shown in Figure 3 so that the gears 30 and 34 have an outlet side communicating with an outlet port 48. The outlet port for the gears 32 and 36 is indicated at 54. These two sets of gears have respective inlet ports 52 and 50. The outlet port 48 and the inlet port 50 are connected by a passageway 56, shown by dotted lines, extending upwardly around the housing H', whereas the inlet port 52 and the outlet port 54 are connected together or in hydraulic communication by a passageway 58, shown by dash lines, passing through the lower housing H. Passageways 60 and 62 are then provided, communicating with the inlet port 52 and the outlet port 48, and with these latter two passageways external connections may be made respectively as to a reservoir R and a power operated device (cylinder C and piston P) shown diagrammatically in Figure 1.

*Practical operation*

In the operation of my pump structure, assuming the parts in the position shown in Figure 2, rotation of the gears or rotors will result in no oil flow in the passageways 60 and 62. This is because each set of gears is pumping the same amount of oil, and the oil from the outlet of one set is discharged into the inlet of the other set, as shown in solid-line arrows in Figure 1. If the rod 48 is pulled toward the right in Figure 2, the gears 30 and 34 will mesh to a greater degree than the gears 32 and 36 and therefore deliver more oil than the latter gears. They will likewise require more oil to fill the spaces between the teeth. Therefore, oil will flow from the reservoir R to the cylinder C, as shown by the dotted-line arrows in Figure 1, and the degree of such flow can be readily regulated by the degree of mesh and unmesh in the two sets of gears.

When it is desirable to raise the piston P instead of lower it, the rod 48 is pushed inwardly or to the left, resulting in greater volume of oil being pumped by the gears 32 and 36 than by the gears 30 and 34. The oil flow will then be from the cylinder C to the reservoir R, or in a direction opposite the dotted-line arrows in Figure 1, and the speed of upward movement of the piston P may be varied as desired, by changing the position of the housing H' relative to the housing H. Thus the pump is variable as to delivery, and the proportional delivery is not limited to definite steps, but may be of any proportion desired. The degree of delivery may be changed while the pump is in operation, and the flow of oil may be reversed, as desired, or stopped completely in the neutral position of the upper housing relative to the lower housing.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A variable delivery and reversing pump structure comprising an upper housing and a lower housing slidably engaging each other, coacting guides along the side edges of said housings to retain them in slidable engagement with each other, first and second upper gears in the upper housing and first and second lower gears in the lower housing, said first gears meshing with said second gears, the first and second gears in one of said housings being closer together than the first and second gears in the other housing whereby relative movement of the housings increases the degree of mesh of one set of gears while it decreases the degree of mesh of the other set, a fluid inlet and a fluid outlet being provided for each set of intermeshing gears, and means for connecting the outlet of each set of gears with the inlet of the other set of gears so that upon equal mesh the oil is pumped from one set of gears to the other and upon unequal mesh the oil is discharged in one direction or the other through the pump, depending upon which set of gears has predominant mesh.

2. In a variable delivery and reversing pump, a pair of housings arranged side by side, a guide connection between said housings to permit sliding of one relative to the other, a pair of pump rotors in each housing, one pair of said rotors variably meshing with the other pair thereof to form sets of intermeshing rotors, each set of intermeshing rotors having an inlet and an outlet, one pair of said rotors being offset relative to the other pair whereby the degree of meshing of one rotor of one pair with one rotor of the other pair increases as the degree of meshing of the other two rotors decreases when one of said housings is slid relative to the other, means for changing the mesh of said rotors, means for connecting the outlet of each set of meshing rotors with the inlet of the other set of meshing rotors, and motor means for driving each of said pairs of pump rotors.

DONALD J. ORR.